(12) United States Patent
Pronk et al.

(10) Patent No.: US 10,382,723 B2
(45) Date of Patent: Aug. 13, 2019

(54) METHOD AND SYSTEM FOR GENERATING A RECOMMENDATION FOR AT LEAST ONE FURTHER CONTENT ITEM

(75) Inventors: Serverius Petrus Paulus Pronk, Eindhoven (NL); Adolf Proidl, Eindhoven (NL)

(73) Assignee: S.I.SV.EL. SOCIETA ITALIANA PER LO SVILUPPO DELL'ELETTRONICA S.P.A., None (TO) (IT)

( * ) Notice: Subject to any disclaimer, the term of this patent is extended or adjusted under 35 U.S.C. 154(b) by 619 days.

(21) Appl. No.: 12/095,006

(22) PCT Filed: Nov. 24, 2006

(86) PCT No.: PCT/IB2006/054426
§ 371 (c)(1),
(2), (4) Date: May 27, 2008

(87) PCT Pub. No.: WO2007/063468
PCT Pub. Date: Jun. 7, 2007

(65) Prior Publication Data
US 2008/0295133 A1 Nov. 27, 2008

(30) Foreign Application Priority Data
Nov. 30, 2005 (EP) .................................. 05111529

(51) Int. Cl.
*G06F 3/00* (2006.01)
*G06F 13/00* (2006.01)
(Continued)

(52) U.S. Cl.
CPC ......... *H04N 7/163* (2013.01); *H04N 21/4147* (2013.01); *H04N 21/4312* (2013.01);
(Continued)

(58) Field of Classification Search
USPC ....................................................... 725/46, 47
See application file for complete search history.

(56) References Cited

U.S. PATENT DOCUMENTS 5,534,911 A * 7/1996 Levitan ........................... 725/46
5,664,046 A * 9/1997 Abecassis ..................... 386/206
(Continued)

FOREIGN PATENT DOCUMENTS

CA 2479395 A1 7/1995
CN 1640133 A 7/2005
(Continued)

*Primary Examiner* — William J Kim
(74) *Attorney, Agent, or Firm* — Workman Nydegger

(57) ABSTRACT

Method and system (100) for generating a recommendation for at least one further content item is disclosed. A personalized content channel is enabled to play out a plurality of content items (programs) complying with multiple selection criteria. At least one further content item is recommended by a recommender engine (107), the at least one further content item complying with fewer of the multiple criteria. In an embodiment, at least one of the at least one recommended further content item is selected and the multiple selection criteria are adjusted by a scheduler (109) on the basis of at least one characteristic of the selected recommended further content item.

12 Claims, 1 Drawing Sheet

(51) Int. Cl.
*H04N 5/445* (2011.01)
*H04N 7/16* (2011.01)
*H04N 21/4147* (2011.01)
*H04N 21/431* (2011.01)
*H04N 21/45* (2011.01)
*H04N 21/458* (2011.01)
*H04N 21/466* (2011.01)

(52) U.S. Cl.
CPC ....... *H04N 21/4314* (2013.01); *H04N 21/458* (2013.01); *H04N 21/4532* (2013.01); *H04N 21/4668* (2013.01)

(56) References Cited

U.S. PATENT DOCUMENTS

| | | | |
|---|---|---|---|
| 5,682,195 A | 10/1997 | Hendricks et al. | |
| 5,758,257 A * | 5/1998 | Herz | G06Q 20/383 |
| | | | 348/E7.056 |
| 6,088,392 A * | 7/2000 | Rosenberg | H04N 19/176 |
| | | | 375/240.03 |
| 6,256,633 B1 * | 7/2001 | Dharap | G06F 17/30867 |
| 6,662,365 B1 * | 12/2003 | Sullivan | H04N 5/4401 |
| | | | 348/E5.105 |
| 6,859,802 B1 * | 2/2005 | Rui | G06K 9/6215 |
| 7,337,462 B2 * | 2/2008 | Dudkiewicz | H04N 7/163 |
| | | | 725/136 |
| 7,890,517 B2 * | 2/2011 | Angelo | G06Q 10/06 |
| | | | 707/752 |
| 8,712,395 B2 * | 4/2014 | Ramer | G06F 17/30905 |
| | | | 455/414.1 |
| 2002/0057893 A1 * | 5/2002 | Wood | H04N 5/4401 |
| | | | 386/355 |
| 2002/0062454 A1 * | 5/2002 | Fung | G06F 1/3203 |
| | | | 713/300 |
| 2002/0087979 A1 * | 7/2002 | Dudkiewicz | H04N 7/163 |
| | | | 725/34 |
| 2002/0178448 A1 * | 11/2002 | Te Kiefte et al. | 725/46 |
| 2003/0066090 A1 * | 4/2003 | Traw et al. | 725/114 |
| 2003/0067554 A1 * | 4/2003 | Klarfeld et al. | 348/461 |
| 2003/0132605 A1 | 7/2003 | Wiers | |
| 2003/0172378 A1 | 9/2003 | Lalitha et al. | |
| 2003/0226144 A1 * | 12/2003 | Thurston | H04N 7/165 |
| | | | 725/39 |
| 2003/0233241 A1 * | 12/2003 | Marsh | 705/1 |
| 2003/0233655 A1 * | 12/2003 | Gutta | H04N 7/17318 |
| | | | 725/46 |
| 2004/0049788 A1 * | 3/2004 | Mori | H04N 7/17318 |
| | | | 725/58 |
| 2004/0054572 A1 * | 3/2004 | Oldale | G06F 17/30699 |
| | | | 706/1 |
| 2004/0117829 A1 * | 6/2004 | Karaoguz et al. | 725/46 |
| 2004/0123318 A1 * | 6/2004 | Lee et al. | 725/46 |
| 2004/0172267 A1 * | 9/2004 | Patel | G06Q 10/0635 |
| | | | 705/7.29 |
| 2004/0216168 A1 * | 10/2004 | Trovato | H04N 7/163 |
| | | | 725/135 |
| 2004/0268387 A1 * | 12/2004 | Wendling | 725/35 |
| 2005/0076093 A1 * | 4/2005 | Michelitsch | G06Q 30/02 |
| | | | 709/217 |
| 2005/0120368 A1 * | 6/2005 | Goronzy | G06F 17/30787 |
| | | | 725/28 |
| 2005/0203924 A1 * | 9/2005 | Rosenberg | G06F 17/30696 |
| 2005/0251437 A1 | 11/2005 | Meuleman | |
| 2005/0273818 A1 * | 12/2005 | Kobayashi | H04N 21/44222 |
| | | | 725/46 |
| 2006/0010117 A1 * | 1/2006 | Bonabeau | G06N 3/126 |
| 2006/0015352 A1 * | 1/2006 | Wynn | G06Q 30/06 |
| | | | 705/307 |
| 2006/0112408 A1 * | 5/2006 | Crew et al. | 725/45 |
| 2006/0117365 A1 * | 6/2006 | Ueda et al. | 725/112 |
| 2006/0156326 A1 | 7/2006 | Goronzy et al. | |
| 2006/0200467 A1 * | 9/2006 | Ohmori | G06F 21/32 |
| 2006/0218642 A1 * | 9/2006 | Kuppusamy | G06F 21/51 |
| | | | 726/26 |
| 2007/0028262 A1 * | 2/2007 | Bucher et al. | 725/34 |
| 2007/0039018 A1 * | 2/2007 | Saslow et al. | 725/22 |
| 2007/0050196 A1 * | 3/2007 | Jadhav et al. | 705/1 |
| 2007/0094067 A1 * | 4/2007 | Kumar | G06Q 10/04 |
| | | | 705/26.2 |
| 2007/0204308 A1 * | 8/2007 | Nicholas | H04N 7/17318 |
| | | | 725/86 |
| 2007/0294720 A1 * | 12/2007 | Cohen | G11B 27/034 |
| | | | 725/32 |
| 2008/0295133 A1 * | 11/2008 | Pronk et al. | 725/46 |
| 2008/0307461 A1 * | 12/2008 | Tanikawa | H04N 5/44543 |
| | | | 725/53 |
| 2010/0251291 A1 * | 9/2010 | Pino, Jr. | H04N 5/445 |
| | | | 725/34 |
| 2011/0292204 A1 * | 12/2011 | Boncyk | G06F 17/30247 |
| | | | 348/135 |
| 2011/0307783 A1 * | 12/2011 | Robert | H04N 5/445 |
| | | | 715/716 |
| 2012/0089996 A1 * | 4/2012 | Ramer | H04H 60/46 |
| | | | 725/14 |

FOREIGN PATENT DOCUMENTS

| | | |
|---|---|---|
| EP | 1267572 A2 | 12/2002 |
| EP | 1395056 A1 | 3/2004 |
| GB | 2352920 B | 7/2002 |
| JP | 10198697 A | 7/1998 |
| JP | 2005072746 A | 3/2005 |
| RU | 2119726 C1 | 9/1998 |
| RU | 2003136754 A | 5/2005 |
| RU | 2301503 C2 | 6/2007 |
| WO | WO0040021 A1 | 7/2000 |
| WO | WO0139494 A1 | 5/2001 |
| WO | WO0211440 A2 | 2/2002 |
| WO | WO02080552 A2 | 10/2002 |
| WO | WO02102067 A1 | 12/2002 |

* cited by examiner

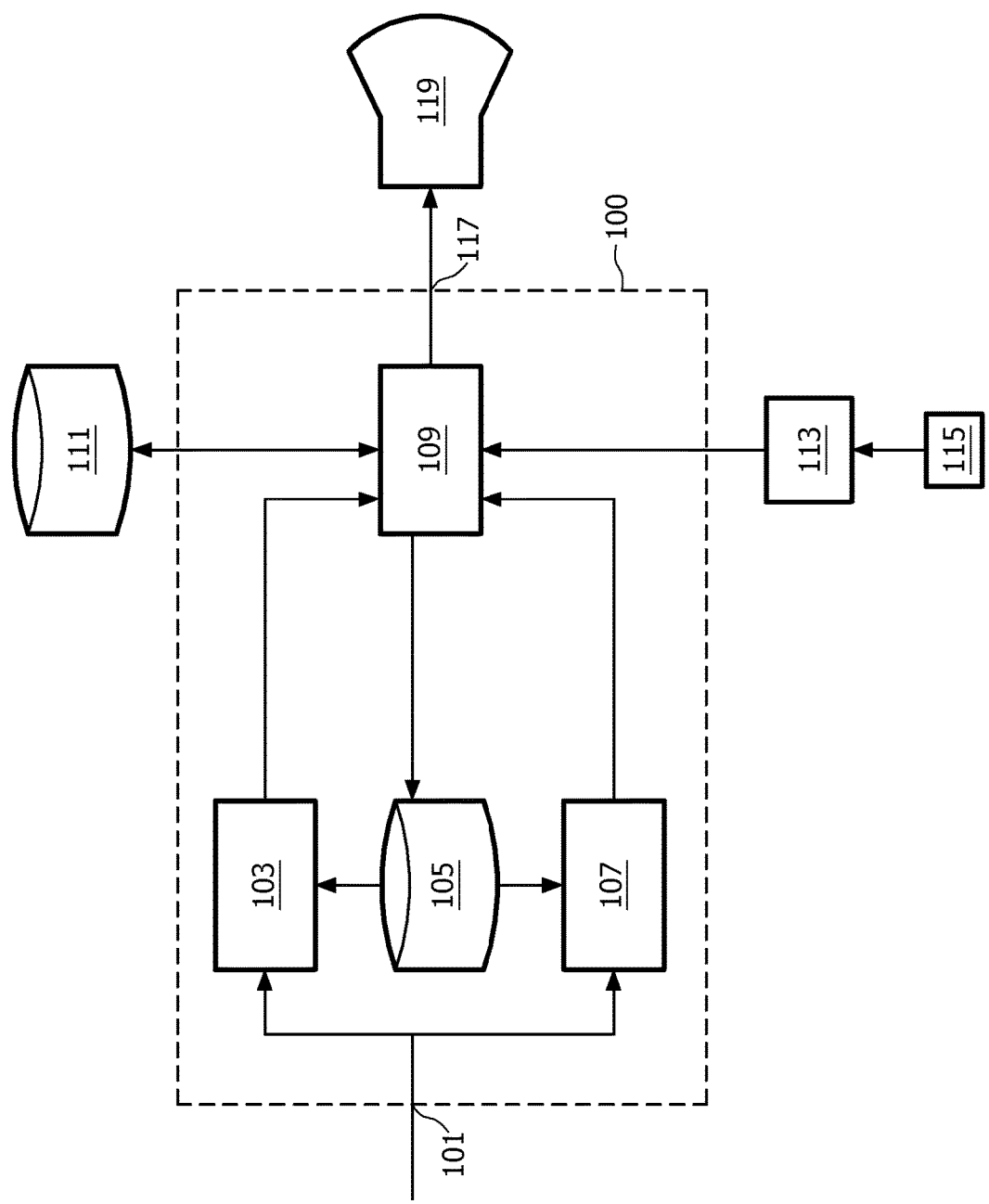

METHOD AND SYSTEM FOR GENERATING A RECOMMENDATION FOR AT LEAST ONE FURTHER CONTENT ITEM

FIELD OF THE INVENTION

The invention relates to generating a recommendation for at least one further content item, e.g. for TV programs and/or songs.

BACKGROUND ART

Personal Video Recorders such as provided by TiVo and computer based systems for digital video recorders such as Windows Media Centre developed by Microsoft are well known. These systems allow a user to schedule programs by means of an electronic program guide. Programs can be recorded on a hard disk drive for subsequent playback at the convenience of the user.

However, given the increasing number of channels available and hence the increasing complexity of the electronic program guide, browsing such guides is time consuming, and it is therefore difficult for users to manually schedule the programs that are to their liking for recordal and/or viewing.

Furthermore, in many existing systems, a large number of programs are recorded and the user must go through a menu hierarchy to browse recorded programs for playback. This has proved to be cumbersome and time consuming. Further, the hard disk drive has limited capacity and soon becomes full. Therefore, the user must browse the recorded program to select an item for deletion before recordal of a new item.

Some of these issues are solved by the creation of a virtual channel (or a personalized content channel) as disclosed, for example in WO-02/080552 and WO 00/40021. A virtual channel comprises a concatenation of content items. WO-02/080552 (US2002-0144282 A1) and WO 00/40021 (U.S. Ser. No. 09/469,875) are herein incorporated by reference.

Each personalized content channel can represent a topic that is clearly recognized by the user, for example, the News channel, the Football channel, the Friends series channel, or the Movie channel. For each personalized content channel there is a (boolean) filter that operates on the entire space of upcoming programs. The programs that pass the filter are automatically scheduled for recording, and made available in the corresponding channel as soon as the recording has started or has been completed. A priority scheme can be employed to resolve any recording conflicts among programs.

Available programs in a personalized content channel can be sequenced and can be deleted depending on the main genre associated with the personalized channel. For example, in a News channel the "freshest" news program is shown first, and only one episode of each different program is kept, in particular as soon as today's 20:00 h newsflash is entirely recorded, yesterday's 20:00 h newsflash will be deleted. A Series channel starts playback at the location where the user left off watching the channel. The position where watching was stopped may be stored so that future playback can commence at the stored position i.e. at the point the user left off watching. It could also be envisaged that, say, the last 5 "where stopped watching" positions may be stored to accommodate usage of the same channel by different users. A deletion strategy may be based on these positions, for example a program that has been watched completely by all users is immediately deleted. In another example, a fixed number of episodes, say, the five most recent ones, are kept on the personalized channel and any earlier episodes deleted.

A personalized content channel is usually accessed as if it were a usual TV channel, e.g. by using channel selection buttons on a remote control and/or by using an electronic program guide. However, since the programs can be recorded, the channel offers the additional benefit of forward/backward picture search, skipping commercials and/or jumping to the next program.

A drawback of the known personalized content channels (i.e. virtual channels) is that the content items played out on the personalized content channels are very predictable, i.e. the known personalized content channels do not provide the user with surprising recommendations.

SUMMARY OF THE INVENTION

The aim of the method and apparatus of the present invention is to provide a method of generating a recommendation for at least one further content item which method is specifically adapted for use with personalized content channels.

This is achieved according to an aspect of the present invention in which there is provided a method of generating a recommendation for at least one further content item, the method comprising the steps of: using a filter with multiple selection criteria for providing a personalized content channel comprising content items complying with all of the multiple criteria; and generating the recommendation for the at least one further content item, the at least one further content item complying with fewer of the multiple criteria. The content item may be, for example, a TV program or a song. The method may be performed by a service provider, for example. The content items may be, for example, recorded broadcast content items or content items, which are available on demand. The filter with multiple selection criteria may comprise multiple filters. For example, each of a plurality of filters may filter on one selection criterion.

In this way recommendations for new content items i.e. content items that do not satisfy the selection criteria completely but partially satisfy them are generated. These recommendations are often surprising, while sufficiently matching user preferences as not to be irritating. As an additional advantage, the method of the invention requires relatively little computation when compared to other recommender systems.

This is also achieved according to a second aspect of the present invention in which there is provided a system for generating a recommendation for at least one further content item, the system comprising a filter with multiple criteria for providing a personalized content channel comprising content items complying with all of the multiple criteria; and a recommender engine for generating the recommendation for the at least one further content item, the at least one further content item complying with fewer of the multiple criteria. The system may comprise one or more apparatus.

The user may indicate which of the multiple criteria should be used to generate the recommendation for the at least one further content item.

The method of the invention may further comprise the steps of: selecting at least one of said at least one recommended further content item and adjusting said multiple selection criteria on the basis of at least one characteristic of said selected at least one recommended further content item.

As a result, this provides natural user feedback (for example emotions and judgements) within the context of the personalized content channel which enables effective adjustment of the selection criteria for the channel to meet the user's preferences. The method is simple so that the user need not have an understanding of the concept of filters that constitutes the personalized content channel.

The recommendations may be listed and the user can merely select a recommended further content item for inclusion on the channel by adjusting the selection criteria or alternatively, further content items can be included automatically by adjustment of the selection criteria, e.g. those further content items that are highly recommended or a random selection of the recommended further content items.

The multiple selection criteria may be adjusted such that only the selected recommended further content item is included on the personalized content channel. This may be achieved by specifically adding all characteristics of the selected recommended further content item or, at least, sufficient characteristics of the selected recommended further content item to distinguish that item. Or, alternatively, the multiple selection criteria may be adjusted on the basis of other characteristics such that similar content items would also be included on the personalized content channel.

The user may select the desired recommended content item from a list displayed, on for example, their television screen or, alternatively, a trailer or promo of the recommended content item is shown and the user selects whilst the trailer or promo is running or after the trailer/promo has completed.

BRIEF DESCRIPTION OF THE DRAWINGS

For a more complete understanding of the present invention, reference is made to the following description in conjunction with the accompanying drawing, in which:

FIG. 1 is a schematic block diagram of apparatus according to embodiments of the present invention.

DETAILED DESCRIPTION OF PREFERRED EMBODIMENT

FIG. 1 is a schematic block diagram of apparatus according to an embodiment of the invention. The apparatus comprises a processor 100 for a personalized content channel for play out of content items (programs, data streams containing video and/or audio data and program segments) on an output rendering device 119, such as, a television, video monitor or the like. The content items are received via, for example, an antenna, cable network, or Internet connection via demodulator/decoding means on the input terminal 101 of the processor 100. The content items include audio and/or video data and information data. The information data contains characteristics of the audio/video data such as genre. These characteristics may be in the form of an attribute and corresponding attribute value.

The input terminal 101 of the processor 100 is connected to the respective inputs of a filter 103 and a recommender engine 107. The filter 103 and the recommender engine 107 have access to a user profile store 105 which may be maintained locally within the processor or may be maintained on a remote server and accessed via a telephone line over the Internet, for example. The output of the filter 103 and recommender engine 107 are connected to a scheduler 109. The scheduler 109 schedules the content items that pass through the filter 103, i.e. those content items which satisfy the selection criteria of the filter 103 (described in more detail below), for recordal in a store 111 and/or play out on an output rendering device 119 connected to the output terminal 117 of the processor 100. The scheduler 109 receives commands from the user via a remote control device 115 and receiver 113.

The operation of the filter 103 will now be described in more detail below.

The selection criteria of the filter 103 stored in the user profile store 105 can be represented by its disjunctive normal form:

$$(a_{11} \wedge a_{12} \wedge \ldots \wedge a_{1_{n_1}}) \vee$$
$$(a_{21} \wedge a_{22} \wedge \ldots \wedge a_{2_{n_2}}) \vee \ldots \vee (a_{m1} \wedge a_{m2} \wedge \ldots \wedge a_{mn_m})$$

wherein $a_{ij}$ represents the $j^{th}$ literal of the $i^{th}$ disjunct.

A content item input to the filter 103 passes through the filter 103 if it meets the selection criteria, namely all the disjuncts are completely satisfied.

Each literal $a_{ij}$ of each disjunct of the selection criteria may be represented by a characteristic of the content item, for example an attribute and corresponding attribute value, say for example, the attributes "time", "channel", "title", "genre", etc. provided by the information data for a content item.

For a particular personalized content channel, the selection criteria could be, for example (Time=19:30 and Channel=RTL4 and Title=RTL4 News and Genre=News) or (Time=20:00 and Channel=Ned1 and Title=NOS Journal and Genre=News).

Therefore, content items that satisfy the selection criteria will pass to the scheduler 109 for recordal in the store 111 and/or play out on the output rendering device 119.

The recommender engine 107 also accesses the selection criteria from which it creates a list of recommended content items. The recommender engine 107 may be capable of rating the content items, for example on a scale from 0 to 1. The recommended content items output by the recommend engine 107 are those considered close to the selection criteria of the filter 103 of the associated personalized content channel. The notion "close" can be defined as follows.

A content item is called "close" to the personalized content channel if it satisfies for at least one disjunct with, say, n literals, exactly n−1 literals and no disjunct is completely satisfied. In other words, exactly one literal is excluded from the disjunct. Of all close content items, a subset with highest ratings could be made, for example, the top 10. The metrics for these ratings is well known in the art and will not be described here. For example, alternative measures of closeness can be defined, for example at least n−2 literals are satisfied.

For the particular example above, the 'RTL4 News' at 22:30 on RTL4 satisfies (Channel=RTL4 and Title=RTL4 News and Genre=News), where the literal 'Time=19:30' in the first disjunct has been excluded. Thus the 'RTL4 News' at 22:30 on RTL4 is "close" to the selection criteria for the filter, and so is the 'NOS Journal' at 17:00 on Ned1, where the literal 'Time=20:00' has been excluded. Therefore these may be considered recommended content items. These recommended content items are forwarded to the scheduler 109 and shown to the user.

In a particular embodiment, literals concerning the genre or other fields that characterize the personalized content channel, i.e. virtual channel, may be an obligatory part of the disjunct and will therefore never be considered for exclusion. Therefore, in the example above, only content items having the Genre=News will be recommended.

In one embodiment, the scheduler 109 forwards a list of the received recommended content items for display on the output rendering device 119. The screen of the output rendering device 119 may comprise two sections, one section displaying those content items that have been scheduled for recording as a result of the filtering by the filter 103, and the other section displaying those content items that have already been recorded for the channel. The latter can be directly selected from that screen for playback. The list of recommended content items can be displayed in a section in the first part of the screen so that recommendations can easily be moved from this part of the screen to the first part of the screen, that is, content items that have been scheduled for recording to be included in the personalized content channel, but whose recording hasn't been performed yet. In this way, the scheduler 109 can schedule the recordal and/or play out of the selected recommended content item.

In an alternative embodiment, the recommended content items can be displayed on demand by pressing a button on the remote control device 115 while watching a personalized content channel. A menu of recommended content items can be displayed on the screen of the output rendering device 119, any of the recommended content items can be selected by the user for inclusion in the personalized content channel. Alternatively, the list of recommended content items can be displayed at the end of viewing a personalized content channel. The list can be shown as part of the personalized content channel.

This allows for easy selection of recommended content items for adjusting the selection criteria of the channel. For example, for a series channel, whose last episode has been broadcast, the user would enter the channel at the end of the channel, once all episodes have been watched. The recommended content items would then be shown for similar series (e.g. same actors, same genre) in order to "continue" this channel.

With the availability of trailers or promos the recommendations at the end of the channel could be displayed in the form of playback of trailers/promos. Alternatively, the trailers/promos can be interleaved with content inside the personal TV channel, for example one trailer, is inserted between two programs shown on the channel. This allows for easy inclusion of the content item by merely pressing a button on the remote control device 115 while the trailer/promo is running.

The user can, therefore, easily adjust the selection criteria by merely selecting from recommended content items and the scheduler 109 altering/adding literals and/or disjuncts of the existing selection criteria of the filter 103.

To include only the selected recommended content item, an additional disjunct could be added of, say, channel, time slot and title to the existing selection criteria. Depending on the content of the disjunct, this may cause addition of the particular content item only, or a series of all episodes etc. The disjunct may also include more content items that appear in the future for which no information data is available yet.

Adjusting the selection criteria to include the selected recommended content item and items that are similar could be achieved by providing an overview of the information data of the recommended content items from which the user can choose which attribute and attribute value pairs should be included in a disjunct of the selection criteria. For example, the user selects a content item from the list of recommended content items, and a pop-up window appears, listing the information data of this content item in the form of attributes and attribute values, allowing the user to select the attributes and values to formulate a new disjunct. In this way, selecting the movie "Speed II" allows the user, for example, to express an interest in the actress 'Sandra Bullock' and the genre 'action'. Immediate feedback on how many additional content items per, say, week will pass the filter as a result of the new disjunct to be added could be provided allowing the user to assess the impact of his decisions.

In another embodiment, the user selects a content item from the list of recommended content items, and a pop-up window appears that suggest how to generalize the filter to include the selected content item and possibly similar content items. For example, it may suggest to exclude that literal that causes the selected content item to satisfy the corresponding, more general disjunct. This can be combined with the approach mentioned above to add new literals to the generalized disjunct.

In a further embodiment, one or more highly recommended content items are selected automatically. These can be added to the filter as described above, or the user profile is used to select the appropriate attributes and values, such that the number of additional content items per, say, week that will pass the filter as a result of the new disjuncts is bounded by an appropriate value.

In the system according to the embodiment of the invention, undesired content items can be easily and persistently removed from a personalized content channel. Persistent removal requires an adjustment of the filter associated with the personalized content channel, in order to exclude future, similar content items from recording and/or inclusion in the personalized content channel.

The user could make a request for deletion by pressing a button on the remote control device 115 while watching undesired content items in a personalized content channel. The scheduler 109 on receiving the command immediately adjusts the selection criteria of the filter 103 of the personalized content channel. Alternatively, the user presses a button on the remote control device 115, while the cursor is positioned on an undesired content item list on the personalized content channel and the scheduler 109 deletes the content items immediately and adjusts the selection criteria of the filter of the personalized content channel. When the user has selected a content item to be removed, this can be effected by extending all disjuncts that the selected content item satisfies to exclude this content item. This can be done by adding the negation of the attribute-value pairs that specify this content item. Alternatively, a pop-up window appears, listing the information data of this content item, allowing the user to select the attributes and attribute values that should be excluded from all disjuncts that the selected content item satisfies or a pop-up window appears that allows the user to adapt the disjuncts that the selected content item satisfies such that the selected content item is excluded. The system can provide suggestions as how to adapt these disjuncts to assist the user, for example, in the case of deletion of an entire series, the system suggests to exclude the series from the disjuncts by means of a "title not equal to % series title %" literal added to the disjuncts.

In case the resulting disjunct becomes provably empty, it can be deleted altogether. For instance, if a disjunct specified a series using channel, time slot and title, and the series is selected for removal, the disjunct can be deleted, as it becomes provably empty.

To aid in the maintainability of the filters, the option exists for the user to remove entire disjuncts. This may be achieved by the user selecting a disjunct from a filter management tool and deleting it or the filter management tool suggesting a disjunct to be deleted, for example, because it hardly encounters any content items that satisfy the disjuncts; the user can then decide to delete it or not. Alternatively, the recommend engine suggests a disjunct to be deleted as it hardly encounters any content item that could be recommended to the user. The user can then decide to delete it or not.

In a further embodiment, a disjunct can be marked so that it is never suggested for deletion, for instance in case the disjunct concerns season-related programs, such as the World Championship Football or Christmas movies.

The system according to the embodiment of the present invention could be utilized to split a personalized content channel by grouping the disjuncts into a number of groups to be split into a corresponding number of filters, i.e. personalized content channels. This grouping can be according to, for example, the genre or title literals of the disjuncts, thus aiding the user to make a useful split.

For example, suppose a user initially created a series channel, starting with the series Friends and later extended it with 'As the World Turns', Neighbors, and Seinfield. He may then wish to slit the personalized content channel into two, one containing the comedies Friends and Seinfield, and one containing the other two series. This can be easily achieved by the system according to the embodiments of the present invention.

Although preferred embodiments of the present invention has been illustrated in the accompanying drawing and described in the foregoing detailed description, it will be understood that the invention is not limited to the embodiments disclosed, but is capable of numerous modifications without departing from the scope of the invention as set out in the following claims.

The invention claimed is:

1. A method, operable in a processor connected to a recommender engine, for generating a recommendation for at least one further content item, the processor operatively coupled to a storage device for storing said multiple criteria and to an output rendering device for displaying recommendations of content items pertaining to a personalized content channel, the processor executing the steps of:

causing said processor to use a filter with multiple selection criteria for providing content items associated with said personalized content channel, wherein each of said content items complies with all of the multiple selection criteria and wherein at least one of said multiple criteria stored in said storage device are associated with a characteristic of said personalized content channel being an obligatory selection criteria;

the recommender engine generating the recommendation for the at least one further content item, wherein the at least one further content item complies with fewer of the multiple selection criteria than available in said filter, wherein compliance with fewer of the multiple selection criteria allows the recommendation to be generated by the recommender engine requiring reduced computation;

rating said recommendation based on a measure of closeness, said measure of closeness being determined based solely on a number of selection criteria to which the at least one further content item satisfies closest to a number of said multiple criteria;

displaying said rated recommendation on said output rendering device, and displaying real-time feedback indicating the number of additional content items per time period that would pass the filter as a result of selecting the rated recommendation;

selecting at least one of said further content items; and playing out on said output rendering device said selected further content item.

2. The method according to claim 1, further comprising the step of allowing a user to indicate which of the multiple selection criteria should be used to generate the recommendation for the at least one further content item.

3. The method according to claim 1, further comprising the steps of:

selecting at least one of said at least one recommended further content item;

adjusting said multiple selection criteria on the basis of at least one characteristic of said selected at least one recommended further content item.

4. The method according to claim 3, wherein adjusting said multiple selection criteria includes the step of:

adjusting the content of said personalized content channel to include said at least one selected recommended further content item for play out on said personalized content channel.

5. The method according to claim 3, wherein adjusting said multiple selection criteria includes the step of:

adjusting the content of said personalized content channel to include content items having said at least one characteristic of said selected at least one recommended further content item for play out on said personalized content channel.

6. The method according to claim 3, wherein the step of selecting at least one of said at least one recommended further content item comprises the steps of:

providing a representation of said at least one recommended further content item;

selecting said representation to select said at least one recommended further content item.

7. The method according to claim 6, wherein the representation comprises said at least one characteristic of said at least one recommended content item.

8. The method according to claim 3, wherein the method further comprises the steps of:

selecting at least one characteristic of a specific one of the content items during play out of said specific one of the content items on said personalized content channel;

adjusting said multiple selection criteria such that content items having said selected characteristic are excluded from play out on said personalized content channel.

9. The method according to claim 3, wherein the step of selecting at least one of said at least one recommended further content item is carried out by the user.

10. The method according to claim 3, wherein the step of selecting at least one of said at least one recommended further content item includes the step of:

automatically selecting at least one recommended further content item having the highest recommendation.

11. A system for generating a recommendation for at least one further content item, the system comprising:

a filter with multiple criteria for providing content items associated with a personalized content channel, wherein each of said content items complies with all of the multiple criteria and wherein at least one of said multiple criteria being associated with a characteristic of said personalized content channel being an obligatory criteria; and a recommender engine, connected to a processor for selecting said multiple criteria, and further connected to a storage device for storing said multiple criteria and connected to an output rendering device for displaying recommendations of content items pertaining to said personalized content channel, the processor:

generating the recommendation for the at least one further content item, wherein the at least one further content item complies with fewer of the multiple selection criteria than available in said filter, wherein compliance with the fewer of the multiple selection criteria allows the recommendation to be generated by the recommender engine requiring reduced computation;

rating said recommendation based on a measure of closeness, said measure of closeness being determined based on a number of criteria to which the at least one further content item satisfies closest to a number of said multiple criteria, the closeness measure being further calculated according to the following rule: for at least one disjunct in the recommendation having n literals, wherein each literal is a selection criteria for the filter, ensuring that n−1 m literals and no disjunct is satisfied, such that exactly m literals are excluded from the disjunct, and displaying said rated recommendation on said output rendering device, and displaying real-time feedback indicating the number of additional content items per time period that would pass the filter as a result of selecting the rated recommendation.

12. The system according to claim 11, wherein the processor:

selecting at least one of said at least one recommended further content item; and adjusting said selection criteria on the basis of at least one characteristic of said selected at least one recommended further content item.

* * * * *